3,121,717
PREPARATION OF DIKETOPIPERAZINES
Earl Eugene Fisher and Marvin T. Tetenbaum, Decatur,
Ill., assignors to A. E. Staley Manufacturing Company,
Decatur, Ill., a corporation of Delaware
No Drawing. Filed Jan. 16, 1961, Ser. No. 82,726
5 Claims. (Cl. 260—268)

This invention relates to a new method of preparing diketopiperazines from alpha-substituted alpha-amino acids. More particularly this invention relates to a new and improved method of preparing leucine diketopiperazine from leucine.

Normally diketopiperazines are prepared by condensing two molecules of an alpha-amino acid ester, whereby two molecules of alcohol and one molecule of diketopiperazine are formed. While some success has been attained carrying out this reaction on the free-alpha-amino acid, the ester route is usually recommended since a pure product can be isolated more readily and in better yields.

We have now found that alpha-substituted alpha-amino acids can be readily converted to 3,6-disubstituted-2,5-diketopiperazines by reacting the free acid in a polyhydric alcohol solvent, under an inert atmosphere, such as nitrogen. This is quite surprising for this reason: If glycine is reacted under an inert atmosphere in a polyhydric alcohol solvent, a black tarry mass results, from which only about 20% yield of white material can be recovered after three recrystallizations; on the other hand, the same reaction, carried out in the presence of air, produces a 40% yield of white diketopiperazine crystals. In contrast, an alpha-substituted alpha-amino acid gives the opposite result. The same reaction in a polyhydric alcohol solvent gives a higher yield of light-colored 3,6-disubstituted-2,5-diketopiperazine under an inert atmosphere than in the presence of air. For example leucine yields about 65-75% white leucine diketopiperazine after a single recrystallization of a light straw-colored reaction product, when an inert atmosphere is employed; while, in the presence of air, the reaction product is a dark brown tarry substance, which gives only about a 33% yield of white crystals after three crystallizations. As might be expected, the whiteness of the diketopiperazine is indicative of the purity of the product.

The object of this invention is to prepare white or lightly-colored 3,6 - disubstituted - 2,5 - diketopiperazines from free alpha-substituted alpha-amino acids in good yields.

Any of the common alpha-substituted alpha-amino acids, such as leucine, tyrosine, alanine, isoleucine, valine and phenyl alanine, can be used in this invention. These compounds can have the structure

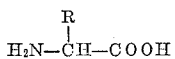

wherein R is alkyl having from 1-4 carbon atoms, phenyl, benzyl or hydroxybenzyl. The preferred amino acid is leucine, since it forms a very light straw-colored leucine diketopiperazine, which can be converted to a white crystalline material in a single, almost quantitative recrystallization from ethanol. Tyrosine, which forms a crude, light yellow tyrosine diketopiperazine in yields as high as 80% or more is slightly less preferred, since it must be recrystallized several times in order to get about 50–55% yield of white crystals. However, both the crude leucine diketopiperazine and tyrosine diketopiperazine are so lightly colored that they may be used without any purification by crystallization. It is to be understood that these crude products are most completely pure. Another important reason for our preference for leucine and tyrosine is that they comprise about 80% by weight of the amino acid by-product formed in the preparation of monosodium glutamate from corn gluten, and are, therefore, readily available.

While this invention is primarily directed to preparing diketopiperazines from a single alpha-substituted alpha-amino acid, we can use impure mixtures of the above amino acids. For example, we have used this process to prepare essentially pure leucine diketopiperazine in about 50% yield (based on the mixture) from the above-mentioned glutamate by-product, after first removing water-insoluble tyrosine.

Any polyhydric alcohol, such as ethylene glycol, 1,2-propylene glycol, 1,3-butylene glycol, glycerin, etc., which is at least a partial solvent for amino acid at the reaction temperature may be used. Ethylene glycol is preferred since it is a relatively good solvent for both amino acids and diketopiperazines under the reaction conditions, while diketopiperazines can be precipitated rather easily from the reaction mixture by cooling and/or adding water. The various other dihydric alcohols are not quite as good solvents for amino acids or as inexpensive as ethylene glycol, and diketopiperazines are harder to precipitate from glycerol. The polyhydric alcohols are preferably used in as small an amount as possible, which is sufficient to dissolve the amino acid at the reaction temperature used. The amount of polyhydric alcohol varies depending on the particular polyhydric alcohol and amino acid used. Under some circumstances a low boiling water-insoluble organic solvent, such as benzene, may be dropped into the reaction mixture during the reaction. The removal of an organic solvent-water azeotrope helps push the equilibrium in the desired direction.

Any inert gas, such as nitrogen, argon, neon, etc., may be used in this invention.

In somewhat greater detail, this invention comprises dispersing an alpha-substituted alpha-amino acid in a polyhydric alcohol, blanketing the reaction mixture with an inert gas and then heating the reaction mixture to from about 100° C.–220° C. The preferred temperature range is from about 165° C.–200° C. At temperatures above 200° C., the amino acid has a tendency to decarboxylate, and this results in a somewhat lower yield of diketopiperazine. At temperatures below 165° C., the amino acid is markedly less soluble in dihydric alcohols, and this decreases the rate of reaction. Preferably, the reaction is carried out slightly (about 10° C.) below the boiling point of the dihydric alcohol solvent. It is possible to produce the diketopiperazines in almost quantitative yields by recycling the polyhydric alcohol containing dissolved diketopiperazine and additional amino acid. This process can be carried out in a vessel equipped with a reflux condenser as well as in an autoclave so long as an inert atmosphere is maintained in the reaction vessel. Where a reflux condenser is used, the vessel must be first purged with inert gas and it is also advantageous to bubble the inert gas through the reaction mixture as the reaction progresses.

The following examples are merely illustrative and should not be construed as limiting the scope of the invention.

*Example 1*

Fifty-two and four-tenths grams of leucine (0.4 mole) and 183.8 grams of ethylene glycol were added to a 2-liter, three-necked flask equipped with stirrer, nitrogen inlet tube and an air condenser having a carbon tetrachloride-Dry Ice trap. While the mixture was being stirred, the reaction vessel was purged with nitrogen. All of the leucine dissolved in the ethylene glycol after heating at from 175–185° C. for one hour. The reaction mixture was maintained at this temperature for another two hours. On cooling to room temperature, an almost white precipitate formed. After adding 200 cc. of water, the reaction product was filtered, washed with water, redispersed in dilute HCl, filtered again, washed with water and dried in a vacuum oven. The recovered white crystals yellowed slightly as they were dried. The slightly yellow crystals weighed 30 grams, which represented a 67% yield. Infra-red analysis confirmed the leucine diketopiperazine structure.

*Example 2*

Example 1 was repeated except that the reaction vessel was equipped with a dropping funnel containing about 15 ml. of benzene that was dropped into the hot reaction mixture. Thirty-three grams (73%) of light yellow leucine diketopiperazine was isolated.

*Example 3*

Two hundred seventy-one and eight-tenths grams of tyrosine and 1700 mls. of ethylene glycol were added to a 5-liter autoclave equipped with a stirrer. While the mixture was being stirred, the reaction vessel was purged with nitrogen. All of the tyrosine dissolved in the ethylene glycol after heating at 180° C. for 10 hours. The reaction mixture was maintained at this temperature for another 16 hours. On cooling to room temperature, a light yellow precipitate formed. The reaction mixture was diluted with 1800 cc. of water and filtered. The filter cake was washed with water, dispersed in cold dilute HCl, filtered, washed with water and dried to constant weight. The light yellow crystals weighed 203 grams, representing an 83% yield. After four recrystallizations from pyridine, 130 grams of pure white crystals were obtained, representing a 53% yield.

*Example 4*

This example illustrates the preparation of essentially pure leucine diketopiperazine from a tyrosine-free amino-acid by-product resulting from the preparation of monosodium glutamate from corn gluten. Fifty-three grams of the amino acid by-product and 300 grams of ethylene glycol were reacted at 175° C. for six hours and the product was isolated according to the method of Example 2. Twenty-three grams of yellow crystals were isolated, representing a 50% yield (based on weight of the starting materials) of leucine diketopiperazine. The product had the same infra-red spectrum as leucine diketopiperazine and melted at 258–260° C. Part of the solid which was fractionated from hot ethanol had a melting point of 270° C.

*Example 5*

This example illustrates the preparation of a mixed diketopiperazine from leucine and isoleucine. Six and six-tenths grams of leucine, 6.6 grams of isoleucine and 75 grams of ethylene glycol were reacted at 175° C. for five hours and the product was isolated according to the method of Example 2. Five and one-half grams of slightly yellow crystals, representing a 49% yield, were isolated. After one recrystallization from ethanol, the white crystals melted at 277–278° C.

Since many embodiments of this invention may be made and since many changes may be made in the embodiments described, the foregoing is to be interpreted as illustrative only, and our invention is defined by the claims appended hereafter.

We claim:

1. The process of preparing 3,6-disubstituted-2,5-diketopiperazines, which comprises heating an alpha-amino acid having the formula

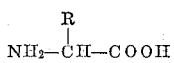

wherein R is selected from the group consisting of alkyl having from 1–4 carbon atoms, phenyl, benzyl and hydroxybenzyl in a polyhydric alcohol solvent under an inert atmosphere.

2. The process of claim 1 wherein the reaction is carried out at from 100° C.–220° C.

3. The process of claim 2 wherein the polyhydric alcohol is ethylene glycol.

4. The process of preparing leucine diketopiperazine, which comprises heating leucine in a polyhydric alcohol solvent under an inert atmosphere.

5. The process of preparing tyrosine diketopiperazine, which comprises heating tyrosine in a polyhydric alcohol solvent under an inert atmosphere.

References Cited in the file of this patent

Sannie: Bull. Soc. Chim., volume 9, page 487 (1942).
Schott et al.: Journal Organic Chemistry, volume 12, page 490 (1947).
Chemical Abstracts, 53, 11396a (1959).

UNITED STATES PATENT OFFICE

CERTIFICATE OF CORRECTION

Patent No. 3,121,717 February 18, 1964

Earl Eugene Fisher et al.

It is hereby certified that error appears in the above numbered patent requiring correction and that the said Letters Patent should read as corrected below.

Column 1, line 58, for "light" read -- lightly --; line 69, for "most" read -- almost --.

Signed and sealed this 23rd day of June 1964.

(SEAL)
Attest:

ERNEST W. SWIDER
Attesting Officer

EDWARD J. BRENNER
Commissioner of Patents